United States Patent
Cooper et al.

(10) Patent No.: US 10,782,706 B2
(45) Date of Patent: Sep. 22, 2020

(54) AIRCRAFT DERIVED SPREAD SPECTRUM LANDING SYSTEM

(71) Applicant: BAE SYSTEMS INFORMATION AND ELECTRONIC SYSTEMS INTEGRATION INC., Nashua, NH (US)

(72) Inventors: David M. Cooper, New York, NY (US); Dominick J. Gasparri, West Milford, NJ (US); Andrew Hunton, Nutley, NY (US); Joel D. Reiss, Bloomfield, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 284 days.

(21) Appl. No.: 15/882,351

(22) Filed: Jan. 29, 2018

(65) Prior Publication Data
US 2019/0235525 A1 Aug. 1, 2019

(51) Int. Cl.
*G05D 1/06* (2006.01)
*G01S 5/02* (2010.01)
(Continued)

(52) U.S. Cl.
CPC .......... *G05D 1/0684* (2013.01); *B63B 35/50* (2013.01); *B64F 1/00* (2013.01); *B64F 1/18* (2013.01); *G01S 5/0215* (2013.01); *G01S 5/0221* (2013.01); *G01S 5/0226* (2013.01); *G08G 5/0021* (2013.01); *G08G 5/025* (2013.01); *H01Q 1/34* (2013.01)

(58) Field of Classification Search
CPC .... G05D 1/0684; G08G 5/0021; G08G 5/025; B64F 1/18; B64F 1/00; G01S 5/0215; G01S 5/0226; G01S 5/0221; H01Q 1/28; H01Q 1/125; H01Q 1/34; B63B 45/08; B63B 45/04; B63B 35/50
See application file for complete search history.

(56) References Cited

U.S. PATENT DOCUMENTS 4,157,544 A * 6/1979 Nichols .................. G01S 13/86
                                                    342/120
5,952,961 A * 9/1999 Denninger ............ G01S 7/4004
                                                    342/357.3

(Continued)

OTHER PUBLICATIONS

PCT Search Report, PCT/US19/14921, dated Apr. 11, 2019, 3 pages.

*Primary Examiner* — Peter D Nolan
*Assistant Examiner* — Ashley L Redhead, Jr.
(74) *Attorney, Agent, or Firm* — Sand, Sebolt & Wernow, LPA (57) ABSTRACT

The present disclosure provides a spread spectrum landing system with a low probability of intercept altimeter that is in communication with a plurality of asymmetrically placed antennas or transponders near a landing area. The low probability of intercept altimeter acts as a secondary system in the event that a primary landing system for the mobile platform is denied or otherwise inoperable. The low probability of intercept altimeter cycles through unique pseudo noise (PN) codes to determine a line of sight relative to each antenna or transponder. A single algorithm or process determines and ranges the platform relative to the transponders to effectuate the landing of the platform.

15 Claims, 7 Drawing Sheets

(51) Int. Cl.
   *B63B 35/50* (2006.01)
   *B64F 1/00* (2006.01)
   *H01Q 1/34* (2006.01)
   *G08G 5/02* (2006.01)
   *B64F 1/18* (2006.01)
   *G08G 5/00* (2006.01)

(56) References Cited

U.S. PATENT DOCUMENTS

| | | | |
|---|---|---|---|
| 6,407,697 B1 | 6/2002 | Hager et al. | |
| 9,355,564 B1 * | 5/2016 | Tyson | G08G 5/0008 |
| 2016/0327370 A1 * | 11/2016 | Holder | G01S 13/883 |
| 2019/0100313 A1 * | 4/2019 | Campbell | B64D 1/02 |

* cited by examiner

AIRCRAFT DERIVED SPREAD SPECTRUM LANDING SYSTEM

BACKGROUND

Technical Field

The present disclosure relates generally to landing systems to assist in landing a mobile platform. More particularly, the present disclosure relates generally to a secondary or auxiliary landing system for landing the mobile platform that can be implemented or activated in the event that a primary landing system is denied or disabled. Specifically, the present disclosure relates to a spread spectrum landing system implemented by a low probability of intercept altimeter carried by the mobile platform.

Background Information

Landing a mobile platform, such as an aircraft (i.e., jet, helicopter, or other manned or unmanned aerial vehicles), typically takes coordinated effort by a pilot and various electrical systems carried by the aircraft or in communication with the aircraft from a central station. Conventional landing systems typically utilize some form of a global positioning system (GPS) in conjunction with other processes to land the aircraft in a precise location.

As an illustrative example, aircraft are able to land aboard a ship that may be moving independent of the aircraft. For example, an aircraft carrier has at least one runway on a deck of the carrier that is extended for aircraft to launch from and land thereon. Other types of vessels have landing areas or landing pads to accommodate aircraft that launch and land in near vertical manners, such as helicopters or vertical thrusted fighter jets.

When aircraft land aboard vessels, they typically rely, at least in part, on various GPS or other landing assistance systems aboard the ship. Typically, a communication link is established between the ship systems and the aircraft that coordinate to land the aircraft.

However, ships are often deployed in hostile environments in which an enemy may be jamming certain signals or frequencies, such as the GPS band. Alternatively, in hostile environments, the landing systems aboard the ship may become disabled.

Some aircraft are now outfitted with Low Probability or Intercept (LPI) and Low Probability of Detection (LPD) devices. These LPI and LPD devices implement systems in a stealth-like manner so as to be substantially or wholly undetected by an enemy. One exemplary device is a Low Probability of Intercept Altimeter (LPIA) that performs altimeter functions (i.e., measuring altitude) in a LPI manner. LPIAs are affordable, have a high TRL, and generally a low size, weight, and power (SWaP).

SUMMARY

Issues continue to exist with conventional landing systems, especially as they relates to landing a mobile platform aboard a ship. Thus, a need continues to exist to provide a secondary landing system that can be activated in the event that a primary landing system is denied. The present disclosure addresses these and other issues by providing a spread spectrum landing system that can be implemented in legacy (i.e., preexisting) LPI and LPD devices on the aircraft. For example, the present disclosure may provide a spread spectrum landing system that utilizes a LPIA in a heretofore unknown manner.

In accordance with one exemplary aspect of the present disclosure, an embodiment may provide secondary spread spectrum landing system. The landing system may include an LPI or LPD device, such as an LPIA, on a mobile platform. The LPIA may be retrofitted to be used in a manner not originally intended for the LPIA. The LPIA is transformed to be used in a secondary manner as a landing system if a primary landing system is denied or disabled. In one particular embodiment, the LPIA is suitable as a secondary landing system for shipboard landings. The LPIA may be a suitable secondary landing system as it minimizes A-kit integration, is independent from shipboard systems (or other landing systems), minimally relies on GPS (which can be denied) and is affordable, has a high TRL, and low SWaP. The LPIA is a secondary landing system when the platform is landing on a deck of a ship that may be moving or have the following displacement parameters: a pitch in a range from about −5 (degrees) to about 5 (degrees); a roll in a range from about −8 (degrees) to about 8 (degrees); a yaw in a range from about −2.5 (degrees) to about 2.5 (degrees); and heave acceleration in a range from about −0.25 (degrees) to about 0.25 (degrees); with an acceleration from 0 (degrees) centerline with a deck motion period of about 10 seconds about all axes. The landing system typically has a range of about 1 nautical mile with the ability to lock into the ship. More particularly, the ship is installed with a plurality of transceiver antennas on or near the deck of the ship near the landing area. The LPIA is in communication with the plurality of transceiver antennas and the LPIA measures the distance to the antennas from the platform. The plurality of transceiver antennas are asymmetrically placed near the landing area. Additionally, the plurality of transceiver antennas may be repeater antennas. The LPIA may be software modified so as to enable the LPIA to meet Fire Scout Secondary Landing System Requirements. The system may further include at least one non-transitory computer readable storage medium having instructions encoded thereon, that when executed by one or more processors, implement operations to land the platform in a secondary manner in response to a primary landing system becoming inoperable and independent from the ship or other control tower. The instructions can implement a robust Newton-Raphson process so as to have only a single algorithm or process or method to support both the approach phase and a landing phase of the platform. The plurality of transceiver antennas (i.e., transponders) is each assigned a unique PN code, which is known by the LPIA on the platform and the LPIA sequences through the PN codes to compute a line of sight to each antenna/transponder. The LPIA may compute an output (x, y, z, Vx, Vy, Vz) solution to the LPIA at a certain frequency, such as 32 Hz.

In accordance with another aspect of the present disclosure, another exemplary embodiment may provide a spread spectrum landing system comprising: a platform, wherein the platform is an aircraft; and a Low Probability of Intercept Altimeter (LPIA) carried by a platform in operative communication with a plurality of antennas positioned near a landing area, wherein the LPIA is configured to sequence through unique pseudo noise (PN) codes to compute a line of sight (LOS) range to each antenna. This exemplary embodiment or another exemplary embodiment may further provide at least one non-transitory computer readable storage medium having instructions encoded thereon that, when executed by at least one processor, implement operations to determine a position of the platform relative to the antennas, the operations including an execution of a single process to support both approach and vertical landing phases of the platform. This exemplary embodiment or another exemplary embodiment may further provide wherein the at least one non-transitory computer readable storage medium is carried by the platform. This exemplary embodiment or another exemplary embodiment may further provide wherein the execution of the single process to support both approach and vertical landing phases of the platform is a Newton-Raphson positioning process. This exemplary embodiment or another exemplary embodiment may further provide activation logic coupled with the at least one non-transitory computer readable storage medium, wherein the activation logic initiates the spread spectrum landing system when a primary landing system on the platform is disabled such that the spread spectrum landing system is a secondary system on the platform relative to the primary landing system. This exemplary embodiment or another exemplary embodiment may further provide a ship having a deck configured to support the platform, wherein the landing area is on the deck. This exemplary embodiment or another exemplary embodiment may further provide a first antenna and a second antenna that are mounted to the deck. This exemplary embodiment or another exemplary embodiment may further provide a third antenna mounted to the deck of the ship positioned near the landing area and spaced from the first antenna and the second antenna; and a fourth antenna mounted to the deck of the ship positioned near the landing area and spaced from the first antenna and the second antenna and the third antenna. This exemplary embodiment or another exemplary embodiment may further provide wherein the four antennas are asymmetrically positioned on the deck. This exemplary embodiment or another exemplary embodiment may further provide that the spread spectrum landing system of Claim is independent from geolocations systems aboard the ship, or is independent from inertial measurement systems aboard the ship.

In accordance with another aspect of the present disclosure, another exemplary embodiment may provide a method for landing a platform comprising: receiving a signal from a first antenna and a signal from a second antenna at in a Low Probability of Intercept Altimeter (LPIA) carried by a platform approaching a landing area; sequencing through unique pseudo noise (PN) codes to compute a line of sight (LOS) range to each antenna from the platform; and landing the platform in the landing area. This exemplary embodiment or another exemplary embodiment may further provide approaching the platform towards the landing area in an approach phase; descending the platform towards the landing area in a landing phase. This exemplary embodiment or another exemplary embodiment may further provide wherein descending the platform towards the landing area in the landing phase occurs in a directly vertical descent. This exemplary embodiment or another exemplary embodiment may further provide wherein the landing area is defined by a deck on a ship, and further comprising: descending the platform towards the deck in a directly vertical manner. This exemplary embodiment or another exemplary embodiment may further provide determining that a primary landing system on the platform is inoperable; and initiating the landing of the platform in the landing area via activation logic in response to the determination that the primary landing system is inoperable. This exemplary embodiment or another exemplary embodiment may further provide receiving low probability of intercept (LPI) and low probability of detection (LPD) waveforms at the LPIA, wherein the first antenna and the second antenna that emit the LPI and LPD waveforms are asymmetrically placed near the landing area. This exemplary embodiment or another exemplary embodiment may further provide computing an output solution from the LPI and LPD waveforms in the LPIA; and providing the output solution to a platform control system and landing the platform in response to the output solution. This exemplary embodiment or another exemplary embodiment may further provide wherein the landing area is defined by a deck on a ship, and further comprising: landing the platform while the deck is moving with a pitch in a range from about −5° to about 5°, with a roll in a range from about −8° to about 8°, with a yaw in a range from −2.5° to about 2.5°, and a heave acceleration from about −0.25° to about 0.25°.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

A spread spectrum landing system is shown generally throughout the figures at 10. The spread spectrum landing system, which may also be referred to generally as "the system 10," may include a platform 12, a Low Probability of Intercept Altimeter (LPIA) 14, a plurality of transponders or antennas 16, a landing area 18, a line of sight 20 for each antenna relative to an LPIA 14, at least non-transitory computer readable storage medium 22, at least one processor 24, and activation logic 26.

Figure 1:
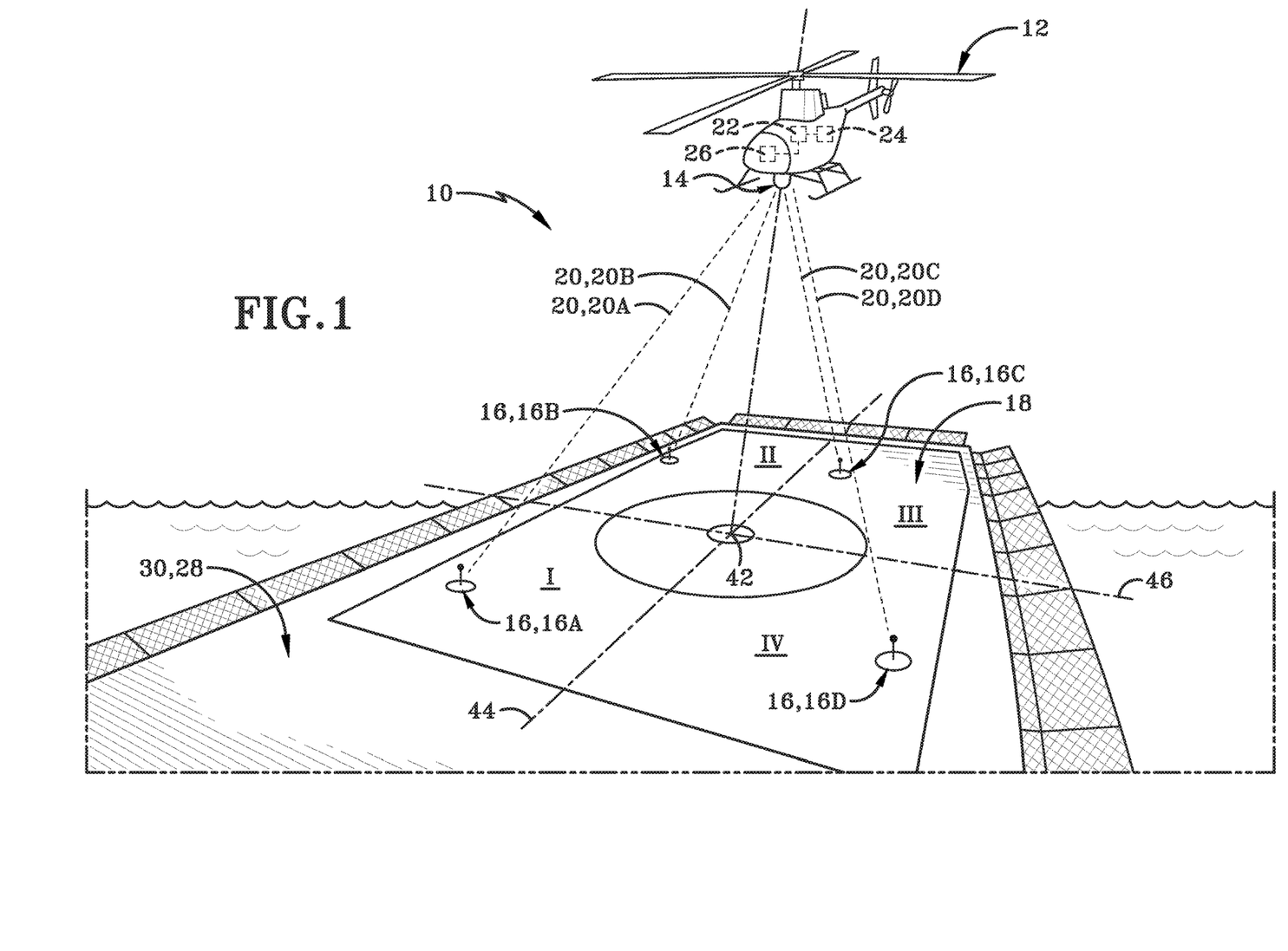
FIG. 1 (FIG. 1) is a diagrammatic perspective view of a spread spectrum landing system in accordance with one aspect of the present disclosure.

FIG. 1 depicts the platform 12 in the form of an aircraft or other airborne vehicle. While the platform 12 may be an aircraft having a rotor to effectuate a vertical landing phase, other aircraft may be utilized that have a vertical landing phase associated therewith. For example, in addition to the platform 12 being in the form of a helicopter, such as shown in FIG. 1, a platform could be implemented as a jet that utilizes downward thrust to effectuate a vertical landing or a nearly vertical landing. In addition, the platform in one example is a drone or unmanned aerial vehicle and the present system can guide the operation of the drone to the landing site.

In one particular embodiment, the platform 12 carries and supports the non-transitory computer readable storage medium 22, at least one processor 24, and the activation logic 26 for the LPIA 14.

The LPIA 14 is used to determine and measure the altitude of the platform 12 above a fixed level, such as the surface of the ocean or above the landing area 18. The present disclosure expands the use of a conventional LPIA 14. Accordingly, LPIA 14 is in operative communication with the plurality of antennas 16 which has not heretofore been available for conventional LPIA installations. In one embodiment the LPIA 14 is a high-speed, digital signal processor and radio frequency module, operating on a frequency-hot, spread-spectrum, phase-encoded, low-power signal waveform. This highly effective waveform and signal processing allows the LPIA 14 to extend altimeter accuracy, performance envelope (roll, pitch, and altitude), jamming resistance, and low probability of intercept capabilities beyond conventional altimeters. LPIA 14 achieves high gains in the receiver signal processing yields to low power output, resulting in a simple radio frequency design and eliminates multiple power amplifier circuits. The features of the LPIA 14 help drive the in-field reliability to greater than 6800 hours. The LPIA 14 in one example is a modular design configured to seemingly fit with the platform 12 so as to eliminate A-kit costs by using interchangeable front panels, mounting plates, analog input and output cards, and reuses existing antennas carried by the platform 12.

The LPIA 14 includes a digital input/output (IO) module, an analog I/O module, a digital signal processor module, and an RF module. The digital 10 module is in electrical and operative communication with the analog I/O module. The analog I/O module is in electrical and operative communication with the digital signal processor module. The digital signal processor module is in electrical and operative communication with the RF module.

As depicted in FIG. 1, the LPIA 14 may include beams that are shortwave configurable. In one particular embodiment, the LPIA 14 implements a switched element antenna or an elevation only electronic steerable beam which modulates under software control.

Figure 2:
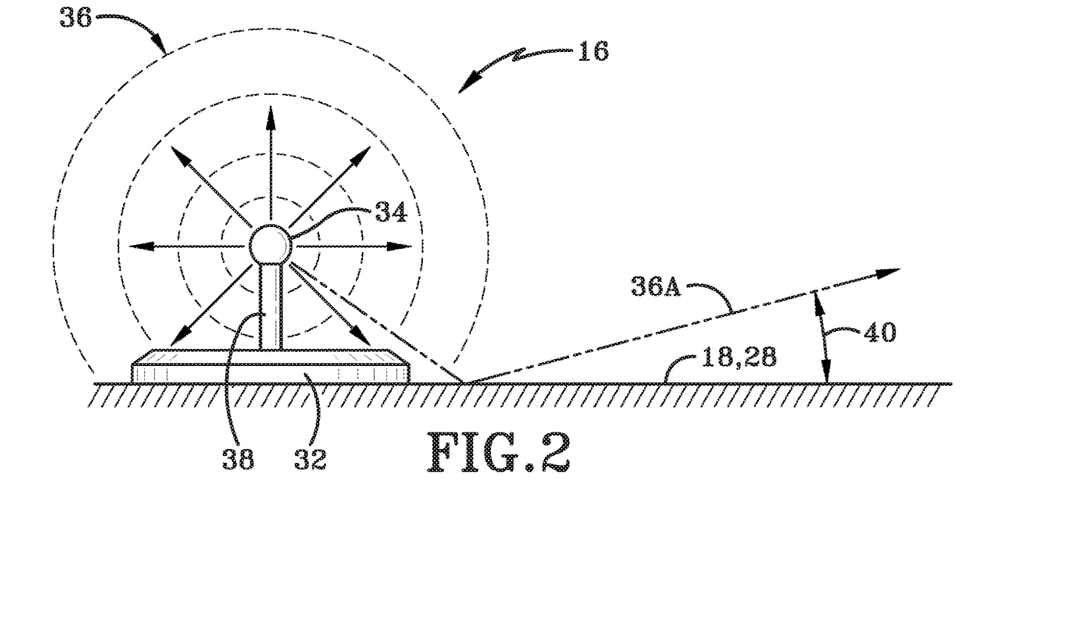
FIG. 2 (FIG. 2) is a side elevation view of one antenna or transponder mounted on the deck of a ship.
Figure 3:
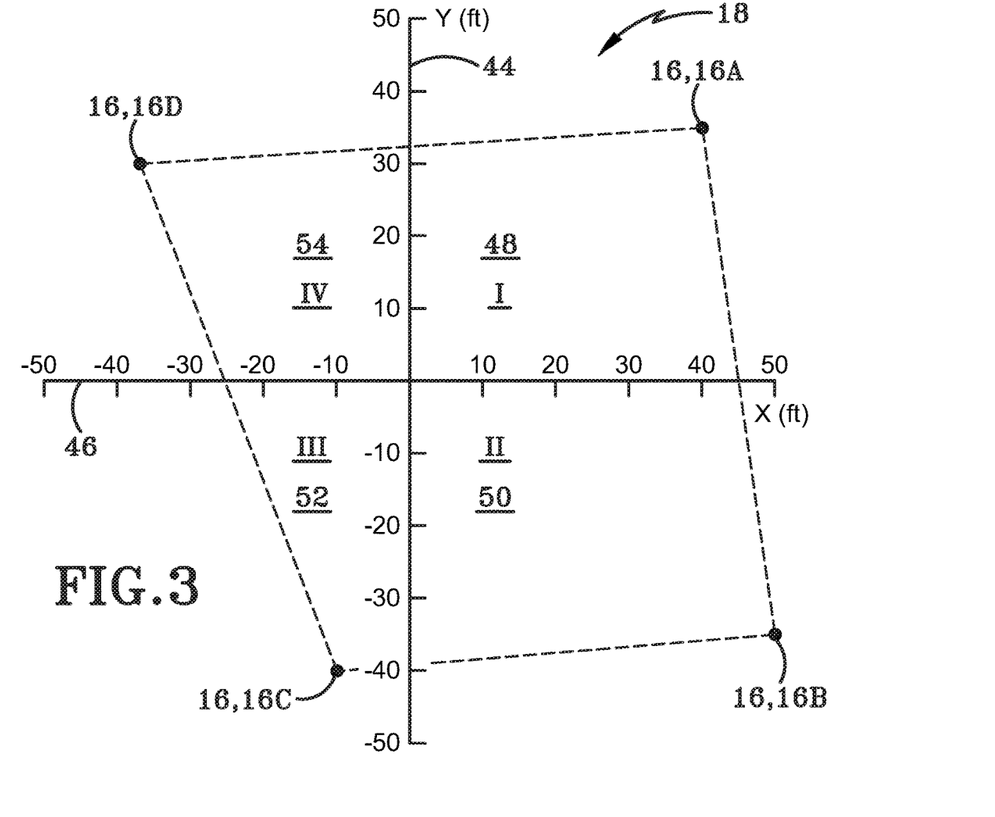
FIG. 3 (FIG. 3) is a diagrammatic view of asymmetrical placement of a plurality of antennas or transponders.

As depicted in FIG. 1-FIG. 3, the landing area 18 may be positioned on the deck 28 of a ship 30. In one particular embodiment, the landing area 18 may be positioned on deck 28 of ship 30 adjacent the aft or stern portion of the ship 30. However, it is entirely possible that the landing are 18 may be located on other portions of the deck 20, such as a bow portion of the deck 28 relative to the ship 30. In other embodiments the landing area is an airborne platform, submarine, floating buoy, floating platform or a terrestrial location.

As depicted in FIG. 2, each one of the plurality of antennas 16 may be mounted to the deck 28 within the landing area 18. However, in alternative embodiments, the antennae can also be deployed or dropped about the landing area. The antennas 16 may include a base 32 and an emitter 34. In one particular embodiment, antenna 16 is configured to emit an omnidirectional signal 36 from the emitter 34. Accordingly, the base 32 houses electrical components and powering components to effectuate the emission of the signal 36 from the emitter 34. In one particular embodiment, the housing 34 may be a signal-absorbing material such that no signals reflect from the housing 34. Furthermore, the housing may be mounted such that it is flush with the deck 28. While not necessary, it is possible for the emitter 34 to be raised via an elongated support 38 to connect with the emitter 34 and the base 32. However, it is entirely contemplated that other embodiments may provide the emitter 34 mounted directly to the housing 32. The emitted signal 36 may travel outwardly from the emitter 34 and the positioning of the emitter 34 may be in a manner such that a reflected angle 40 is very low such that the platform 12 cannot see reflected signals 36A that have reflected from the deck 28. In one particular embodiment, the angle 40 of the reflected signals may be retained at an angle less than about 15°. In addition to the above, the antenna 16 could also be a directional antenna to assist with the reducing the reflection from the surface upon which the antenna 16 is disposed.

As depicted in FIG. 2, antenna 16 may be in the form of a micro strip antenna on top of the housing 32. In one particular embodiment, the micro strip antenna may be shaped with gain pattern for minimizing multipath and deck reflections. The antenna 16 can be a frequency selective surface for out of band rejections. Stated otherwise, the antenna may be filtering certain signals emitted from other antennas or other signals present near the antenna 16. In one example, the antenna 16 is a low SWaP RF transponder that emits signals upon some interrogation. In another example the antenna has no receiver element and transmits the signals continuously or according to some prescribed manner such as a delay. The antenna 16 may have a bent pipe repeater design which includes a transmitter in operative communication with a receiver when powered by a power supply. The bent pipe repeater design of the transponder of each antenna 16 is able to filter out different out-of-band signals to effectuate the filtering process. Antenna 16 preserves phase and amplitude of low percentage of intercept waveforms for precision ranging and performance. In one non-limiting example, the antenna 16 has a housing 32 that is generally cylindrical in shape with an approximately eight-inch diameter having a height or thickness of about 1.5 inches and weighing about five pounds and consuming about five watts.

As depicted in FIG. 1 and FIG. 3, the plurality of antennas 16 mounted to the deck 28 are arranged in an asymmetrical configuration. More particularly, the center of the deck may be identified by a central point 42 such that the deck is intersected by an imaginary first axis 44 and imaginary second axis 46. The perpendicular intersection of the first axis 44 with the second axis 46 establishes an imaginary quadrant system of the landing area 18. State otherwise, the landing area 18 includes a first quadrant 48, a second quadrant 50, a third quadrant 52, and a fourth quadrant 54. In FIG. 3, the first quadrant 48 is shown with a Roman Numeral I, the second quadrant 50 is shown with a Roman Numeral II, the third quadrant 52 is shown with a Roman Numeral III, and the fourth quadrant 54 is shown with the Roman Numeral IV.

The plurality of antennas may be asymmetrically placed relative to the landing area such that one antenna occupies only a single quadrant. In this instance, there would be four antennas, one antenna respectively for each quadrant, namely a first antenna 16A in the first quadrant 48, a second antenna 16B in the second quadrant 50, a third antenna 16C in the third quadrant 52, and fourth antenna 16D in the fourth quadrant 54. The four antennas 16A-16D are asymmetrical inasmuch as they have different coordinates relative to the first and second axes 44, 46. For example, if the first axis 44 is considered a Y-axis and the second axis 46 is considered an X-axis, then one exemplary location for the first antenna 16A may be located at (40, 32) in the first quadrant 48. The second antenna 16B may be located at (50, −38) in the second quadrant 50. The third antenna 16C may be located at (−10, −40) in the third quadrant 52. The fourth antenna 16D may be located at (−38, 30) in the fourth quadrant 54. The actual locations of the four antennas is arbitrary so long as the antennas are asymmetrical relative to each other and relative to the first axis 44 and the second axis 46.

Figure 4:
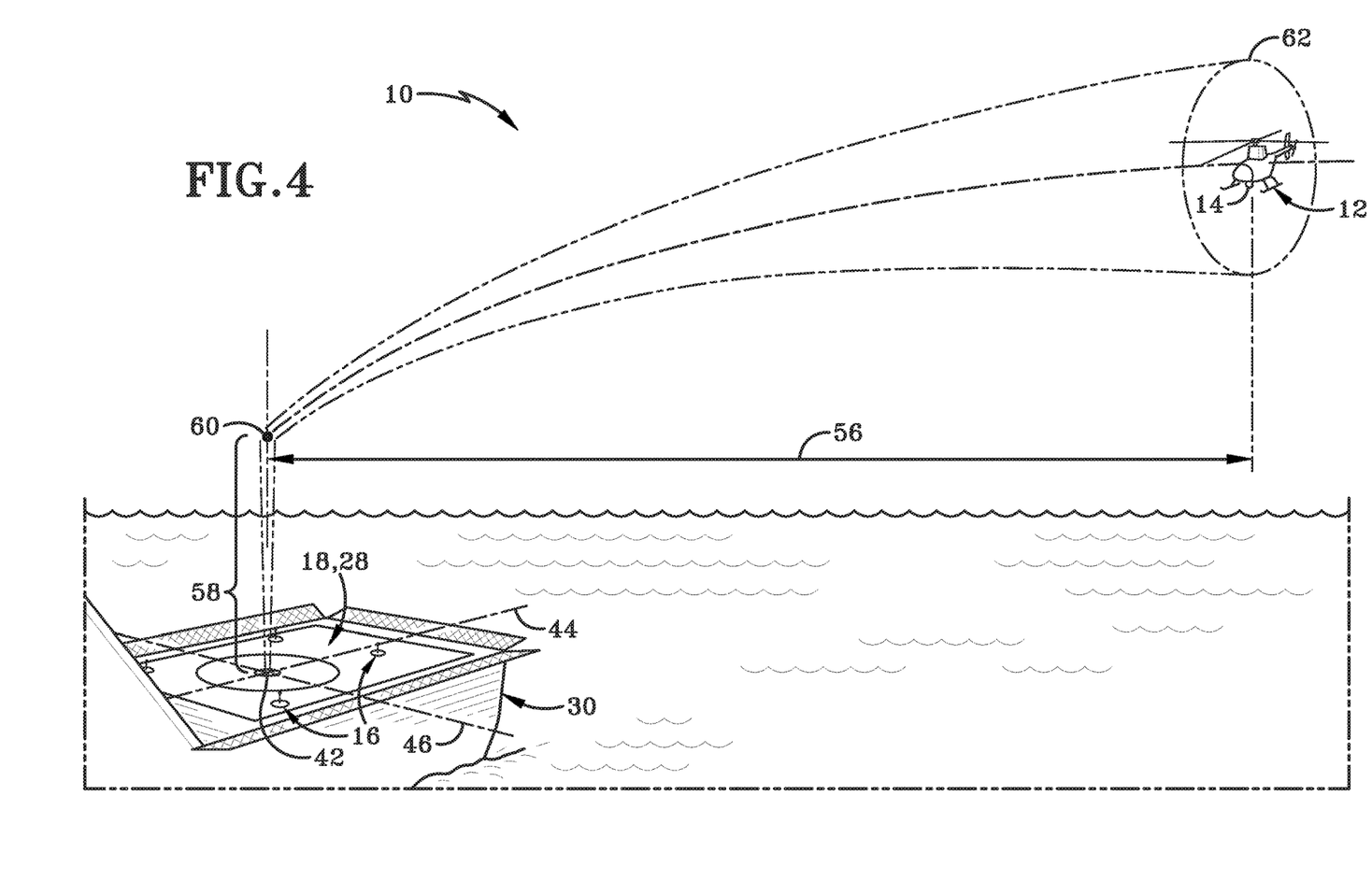
FIG. 4 (FIG. 4) is a diagrammatic perspective view of a mobile platform transitioning from an approach phase to a vertical landing phase.

FIG. 4 depicts an operational view of the system 10 in which the platform 12 carrying LPIA 14 travels along an approach phase 56 and transitions into a vertical landing phase 58 at point 60. During the beginning of the approach phase, such as when the platform 12 is located farther away from the ship 30, an uncertainty region 62 is larger based on the distance or separation of the LPIA 14 relative to the plurality of antennas 16. As the platform moves along the approach phase 56, the uncertainty region 62 narrows as best seen in FIG. 4. The point 60 at which the platform 12 transitions from the approach phase to the vertical landing phase 58 may also be referred to as a high gate. At the high gate location of point 60, the platform 12 is able to clearly locate the landing area 18 through the use of LPIA 14 and its connection with the plurality of antennas 16 located on the deck 28 of the ship 30. Since the antennas or signal emitters are asymmetrically placed on the deck 28 of the ship 30 and each emits a signal 36, each is assigned a unique pseudo noise (PN) code which is received and known by the LPIA 14. The LPIA 14 may use existing low probability of intercept and low probability of detection waveforms to effectuate the signal connection between the emitter 34 and the LPIA 14. The LPIA 14 on the platform 12 will sequence through the unique PN codes emitted in each emitted signal 36 from the respective emitters 34 in order to compute a line of sight (LOS) range for each antenna.

For example, as shown in FIG. 1, a first line of sight range 20A is established between the LPIA 14 and the first antenna 16A. A second line of sight range 20B is established between the LPIA 14 and the second antenna 16B. A third LOS range 20C is established between the LPIA 14 and the third antenna 16C. A fourth line of sight range 20D is established between the LPIA 14 and the fourth antenna 16D. Accordingly, the processor 24 carried by the platform 12 which is in operable communication with the storage medium 22 and the activation logic 26 will assist the LPIA 14 to sequence through the unique PN codes to compute and actively update the respective LOS ranges 20A-20D to each respective antenna 16A-16D. The LPIA 14 will compute an output solution (x, y, z, Vx, Vy, Vz) to the platform control system. In one particular embodiment, the solution is computed at a frequency of 32 Hz, however, other frequencies are entirely possible.

In accordance with an aspect of the present disclosure, the system 10 enables the platform 12 to be landed in environments when the use of traditional or primary GPS systems aboard the platform 12 are inoperable. Stated otherwise, the system of the present disclosure is independent from the GPS of the platform 12. More particularly, the system 10 in one example is a secondary or auxiliary landing system for the platform 12. It is well-known in the art that primary landing systems typically involve GPS coordinates and other ordinary altimeters to assist in the landing on the platform. However, there may be instances when the GPS signals or the primary landing system of the platform 12 is jammed or otherwise out of service. Thus, the landing system in one example can be thought of as a secondary system which is in operative communication with the primary system of the platform 12. Accordingly, in one example it is the activation logic 26 carried by the platform 12 that determines whether the primary landing system of the platform 12 is operable. The activation logic 26 can either be an independent logic that is responsive to the primary landing system being inoperable, or alternatively the activation logic 26 In the event that the primary landing system is inoperable, then the secondary or auxiliary landing system, which is landing system 10, may be activated or initiated so as to establish the electrical communication between LPIA 14 and plurality of antennas 16 in the landing area 18. System 10 may also be utilized when the environment is obscured or dark. This may allow for an autonomous landing of the airborne vehicle.

Typically, GPS systems, such as the primary landing system of the platform 12, utilize a Newton-Raphson positioning algorithm. The Newton-Paphson positioning algorithm provides excellent performance within approach distances greater than one mile from the landing area 18. The Newton-Raphson positioning algorithm may be applied to landing system 10 of the present disclosure. The positioning algorithm or positioning process implemented by the Newton-Raphson formula enables convergence properties to be excellent and provides very course estimates of position for the start of the landing process. Typically, the positions are generated at a rate of 32 Hz, however, other frequencies are entirely possible. When using an autopilot on the platform 12, the estimated velocities of the platform 12 can be provided to the autopilot system at a rate of up to about 50 Hz. Accordingly, it is a signal algorithm that supports both the approach phase 56 and the vertical landing phase 58 of the flight of the platform 12. As will be described in greater detail below, modeling shows that dispersion is less than about one foot and is significantly tighter than a conventional 12-foot three sigma touchdown dispersion requirement.

Figure 5:
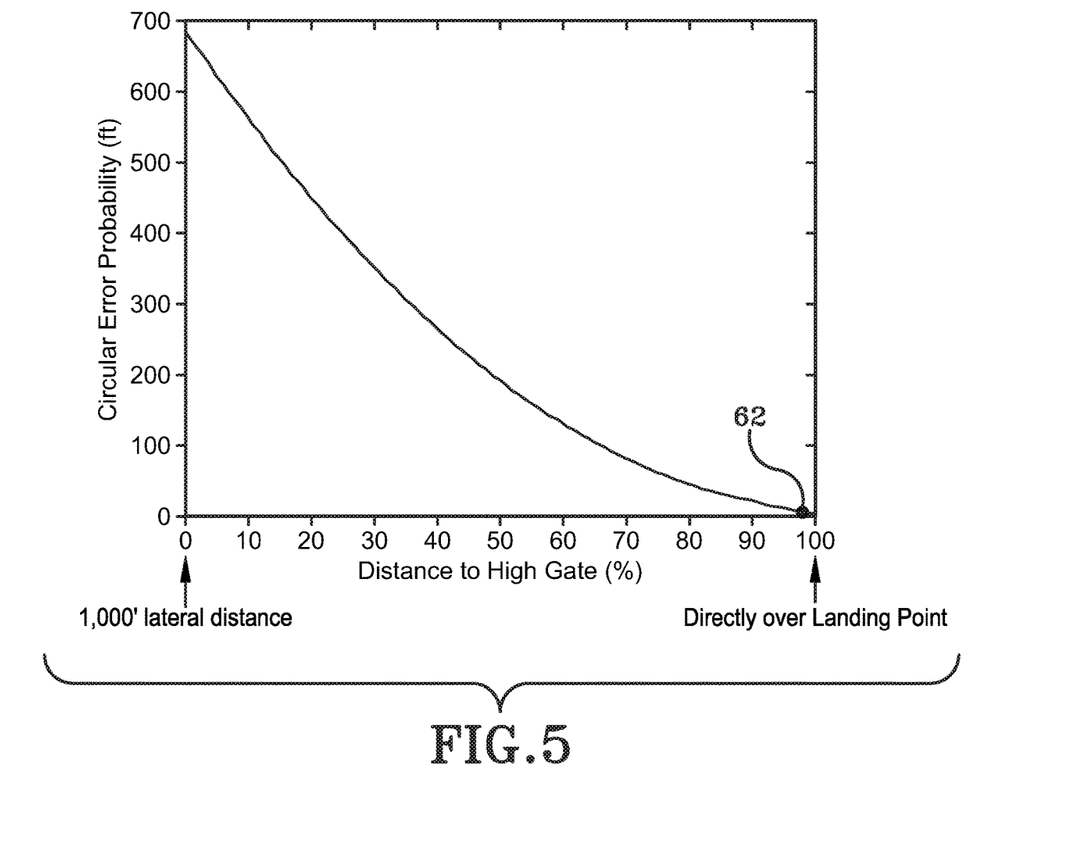
FIG. 5 (FIG. 5) is a graph of a circular error probability versus a percentage distance to a high gate point.

FIG. 5 depicts the circular error probability of the approach phase 56 of the platform 12 moving towards the landing area 18. The Y-axis the circular error probability in feet and the X-axis indicates the percentage of the distance of the high gate or point 60. On the graph of FIG. 5, point (0,0) indicates that the 1,000-foot lateral distance of the approach phase 56 is decreased down to the location at point 62 directly over the landing center 42. The point 62 on FIG. 5 represents that when the percentage of the distance to the high gate is at 98% or very close to directly over the landing point, the circular error probability of the approach phase is about five feet.

Figure 6:
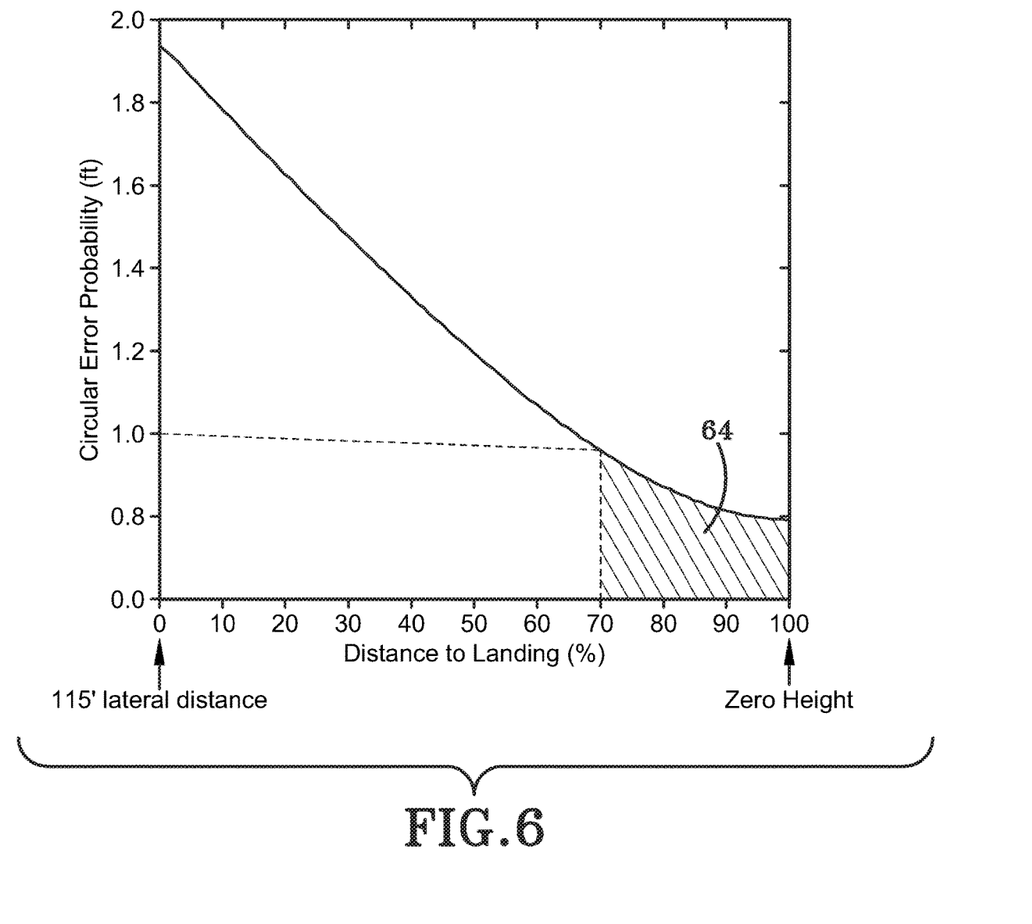
FIG. 6 (FIG. 6) is a graph depicting the circular error probability versus the percentage distance to the landing.

FIG. 6 depicts the circular error probability of the landing phase 58. The Y-axis represents the circular error probability in feet and the X-axis represents the percentage of the distance to the landing wherein the start of the X-axis is a 115-foot lateral distance and 100% of the X-axis is a zero height, which is equivalent to the platform landed upon the deck. At the 115-foot lateral distance (X-axis=zero), the circular error probability is about 1.9 feet and when the platform 12 is approaching the zero height, the circular error probability in feet is less than one foot. More particularly, when the percentage of the distance to the landing is greater than 90% then the circular error probability is less than about one foot. More broadly, when the percentage of the distance to the landing is about 70% of the 115-foot lateral distance, the circular error probability in feet is less than or equal to about one foot. As indicated by region 64 in FIG. 6, system 10 of the present disclosure establishes a circular error probability less than about one foot and the distance to the landing is at least about 70% of that of the original lateral distance during the start of the vertical landing phase 58. As indicated above, this is significantly tighter than conventional 12-foot three sigma touchdown dispersion requirements.

In accordance with another aspect of the present disclosure, system 10 can be outfitted with anti-jamming performance capabilities. Accordingly, the anti-jamming nature of the system 10 enables the landing system to be independent from various navigation systems and inertial measurement systems of the ship 38. The system is not required to broadcast the ship's position. However, it is entirely possible for the ship position to be broadcast to the platform 12. Thus, the independence of the landing system relative to the ship creates a beneficial landing system when or in the event that GPS operation is denied. Furthermore, the radio frequency signals emitted by the antennas 16 enable the system 10 to operate within all weather conditions. Furthermore, the low profile nature of the antenna 16 provide a minimal impact on current deck equipment or other legacy equipment carried by the ship 38. When the LPIA 14 is integrated into Fire Scout Avionics, the system 10 provides a fixed landing capability with the aid of additional avionic equipment.

In one particular implementation, LPIA 14 may utilize a single beam that is operatively pointed downward towards the antenna 16. However, it is envisioned that another embodiment utilizes at least beams emitted from the LPIA 14 to operatively connect with the antenna 16 in order to scan the pseudo noise codes.

In one implementation, the motion of the ship 38 may be considered negligible when the platform 12 is flying slowly. In one exemplary reason, the motion of the ship may be negligible for the calculations of the landing due to the fact that the measurements are made relative to the ship's coordinate system. Typically, ship motion information is needed for high-speed landings. Thus, when radar waveform analysis of the present disclosure may be implemented in order to reduce measurement values to an interval less than two micro seconds. Furthermore, for radar distance measurement equipment (DME) in some implementations, system 10 is considered a passive spread spectrum landing system inasmuch as it is a secondary or auxiliary landing system that is activated in response to the activation logic indicating that the primary landing system is inoperable. However, it is entirely possible for the spread spectrum landing system of the present disclosure to be the primary landing system of the airborne platform 12. The system 10, as a passive landing system, has been shown to work close to the deck 28 of the ship 30. However, system 10 may have some clutter rejection in dynamic range issues that can be accounted for through conventional processing techniques to remove clutter rejections.

Some of the ranging methods utilized in the spread spectrum system 10 perform through RTT delay using high resolution pseudo random spread spectrum correlation and paired pulse processing. Utilizing these ranging methods, the minimum height that is detectable is equivalent to a phase chip length.

Figure 7:
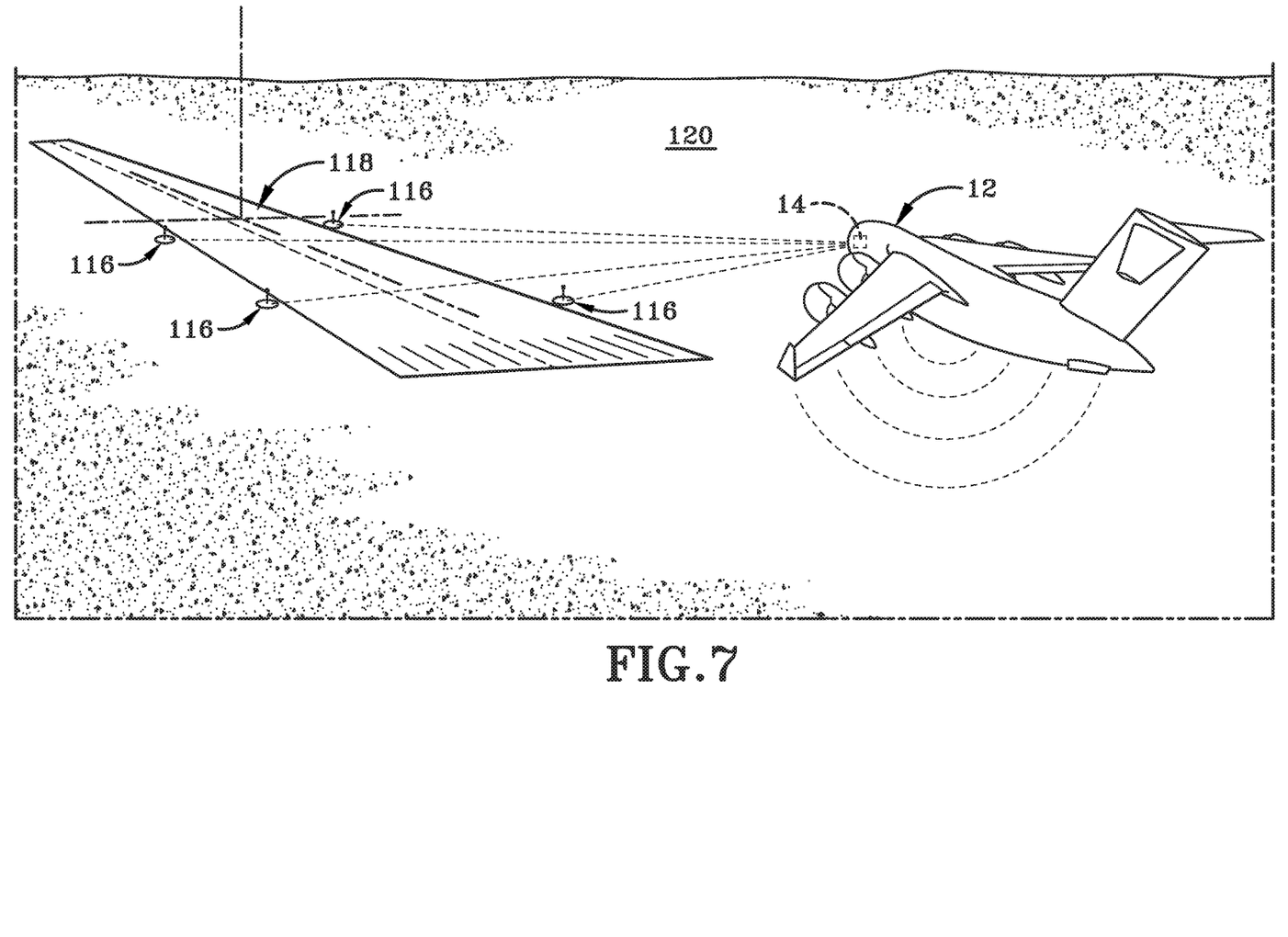
FIG. 7 (FIG. 7) is a diagrammatic perspective view of an alternative embodiment of the present disclosure utilizing a spread spectrum landing system for a fixed landing area.

FIG. 7 indicates that a version of the spread spectrum landing system can be implemented for landing systems needed for covert operations in land-based areas. For example, a platform 12 carrying LPIA 14 can be connected with a plurality of antennas 116 spaced in a landing area 118 that is on a ground surface 120. The spread spectrum landing system identified by FIG. 7 is beneficial when the GPS navigation of the platform 12 is either jammed or otherwise denied. Furthermore, the system of FIG. 7 is beneficial if covert operations are needed and the primary landing system of the platform 12 is disabled so as to operate in a stealth-like mode. Accordingly, the spread spectrum landing system of the present disclosure provides a landing system that is independent of GPS and is a low probability of intercept and platform derived regardless of where the landing area is located. The system can perform as an on-route altimeter, an on-route refueling navigation, and a degraded environment landing assistance system.

Figure 8:
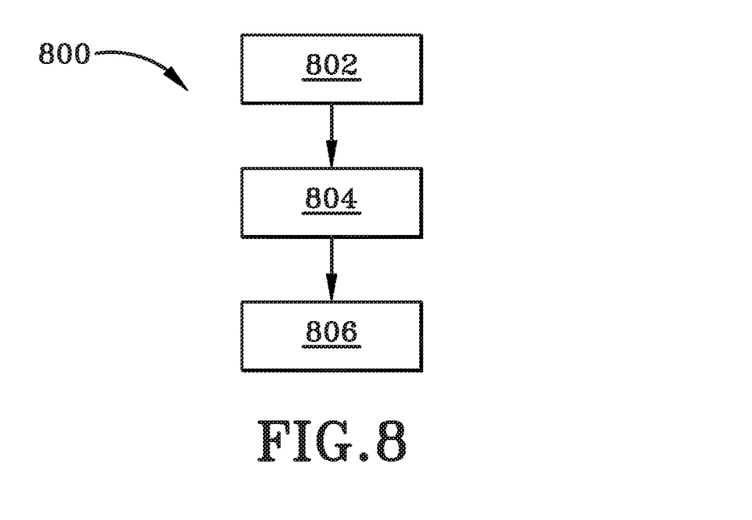
FIG. 8 (FIG. 8) is a flowchart depicting an exemplary method in accordance with one aspect of the present disclosure.

FIG. 8 depicts an exemplary method in accordance with the present disclosure shown generally at 800. The method 800 may provide a method for landing a platform. The method 800 may include receiving a signal from a first antenna and a signal from a second antenna in a LPAI 14 carried by a platform approaching a landing area, which is shown generally at 802. The method 800 may further include sequencing through pseudo noise codes to compute a line of sight range to each antenna from the platform, which is shown generally at 804. The method 806 may further include landing the platform in the landing area, which is shown generally at 806. In addition, the method 800 may further include approaching the platform towards the landing area in an approach phase, such as approach phase 56, and descending the platform towards the landing area in a landing phase, such as the landing phase 58. In some implementations, descending the platform towards the landing area in the landing phase 58 occurs in a directly vertical manner or a directly vertical descent. The method 800 may further comprise wherein the landing area is defined by a deck, such as deck 28, on the ship 30 and further comprises descending the platform towards the deck in a directly vertical manner. Method 800 may further provide for determining that a primary landing system on the platform is inoperable and initiating the landing of the platform in the landing area via activation logic in response to the determination that the primary landing system is inoperable. The method 800 may further provide for receiving LPAI and LPD waveforms at the LPAI 14, wherein the first antenna and the second antenna that emit the LPAI and LPD waveforms are asymmetrically placed near the landing area. The method 800 may compute an output solution from the LPAI and LPD waveforms in the LPAI 14 and provide the output solution to a platform control system, such as the primary control system or another control system, in order to land the platform in response to the output solution. As stated above, the method 800 may be defined when the landing area is on the deck of a ship. In such scenarios, the landing of the platform may occur while the deck is moving with a pitch in a range from about −5° to about 5° with a roll in a range from about −8° to about 8° with a yaw in a range from about −2.5° to about 2.5° and a heave acceleration from about −0.25° to about 0.25°.

In accordance with another aspect of the present disclosure, the teachings of system 10 may be expanded to other implementations or applications. For example, the teachings of system could be utilized as a targeting system. For example, an LPIA 14 could be mounted on a drone and may precise guiding the drone to an enemy target location that is GPS denied. In this instance, it would be necessary to place transponders in the region with denied GPS. The transponders could be dropped from an airborne aircraft or could be installed by solider on the ground. Once, the transponders are in place, the drone could guide itself to the region used in the LPIA 14.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed is:

1. A landing system comprising:
   a platform, wherein the platform is an aircraft;
   a primary landing system on the platform, wherein the primary landing system includes a global position system (GPS);
   a secondary landing system on the platform including a legacy spread spectrum Low Probability of Intercept Altimeter (LPIA) carried by the platform in operative communication with a plurality of antennas positioned near a landing area, wherein the LPIA is configured to sequence through unique pseudo noise (PN) codes to compute a line of sight (LOS) range to two or more antennas;
   at least one non-transitory computer readable storage medium having instructions encoded thereon that, when executed by at least one processor, implement operations to determine a position of the platform with the LPIA relative to the antennas, the operations including an execution of a process to support at least one of approach and vertical landing phases of the platform; and
   activation logic coupled with the at least one non-transitory computer readable storage medium, wherein the activation logic initiates the secondary landing system when the primary landing system on the platform is one of disabled, inoperable, uncertain, and impractical, wherein the activation logic causes the LPIA to sequence through the unique PN codes to compute and actively update respective LOS ranges to each of the at least two antennas.

2. The landing system of claim 1, wherein the at least one non-transitory computer readable storage medium is carried by the platform.

3. The landing system of claim 1, wherein the execution of the process to support the approach and vertical landing phases of the platform is a Newton-Raphson positioning process.

4. The landing system of claim 1, further comprising:
a ship having a deck configured to support the platform, wherein the landing area is on the deck of the ship.

5. The landing system of claim 4, further comprising:
a first antenna and a second antenna that are mounted to the deck.

6. The landing system of claim 5, further comprising:
a third antenna mounted to the deck of the ship positioned in the landing area and spaced from the first antenna and the second antenna; and
a fourth antenna mounted to the deck of the ship positioned near the landing area and spaced from the first antenna and the second antenna and the third antenna.

7. The landing system of claim 6, wherein the four antennas are asymmetrically positioned on the deck.

8. The landing system of claim 1 wherein the secondary landing system is independent from geolocation systems.

9. The landing system of claim 1 wherein the secondary landing system is independent from inertial measurement systems, GPS and ship derived landing systems.

10. A method for landing a platform comprising:
determining that a primary landing system including a global position system (GPS) on the platform is inoperable;
initiating the landing of the platform in a landing area via activation logic in response to the determination that the primary landing system is inoperable
receiving a signal from a first antenna and a signal from a second antenna in a secondary landing system that is a Low Probability of Intercept Altimeter (LPIA) carried by the platform approaching the landing area;
sequencing through unique pseudo noise (PN) codes to compute a line of sight (LOS) range to at least one antenna from the platform; and
landing the platform in the landing area based on the secondary landing system and not the primary landing system.

11. The method for landing the platform of claim 10, further comprising:
approaching the platform towards the landing area in an approach phase;
descending the platform towards the landing area in a landing phase.

12. The method for landing the platform of claim 11, wherein descending the platform towards the landing area in the landing phase occurs in a directly vertical descent.

13. The method for landing the platform of claim 12, wherein the landing area is defined by a deck on a ship, and further comprising:
descending the platform towards the deck in a directly vertical manner.

14. The method for landing the platform of claim 10, further comprising:
receiving low probability of intercept (LPI) and low probability of detection (LPD) waveforms at the LPIA, wherein the first antenna and the second antenna that emit the LPI and LPD waveforms are asymmetrically placed near the landing area.

15. The method for landing the platform of claim 14, further comprising:
computing an output solution from the LPI and LPD waveforms in the LPIA; and
providing the output solution to a platform control system and landing the platform in response to the output solution.

* * * * *